No. 835,808. PATENTED NOV. 13, 1906.
H. T. BRAGG.
TIRE.
APPLICATION FILED JAN. 16, 1906.
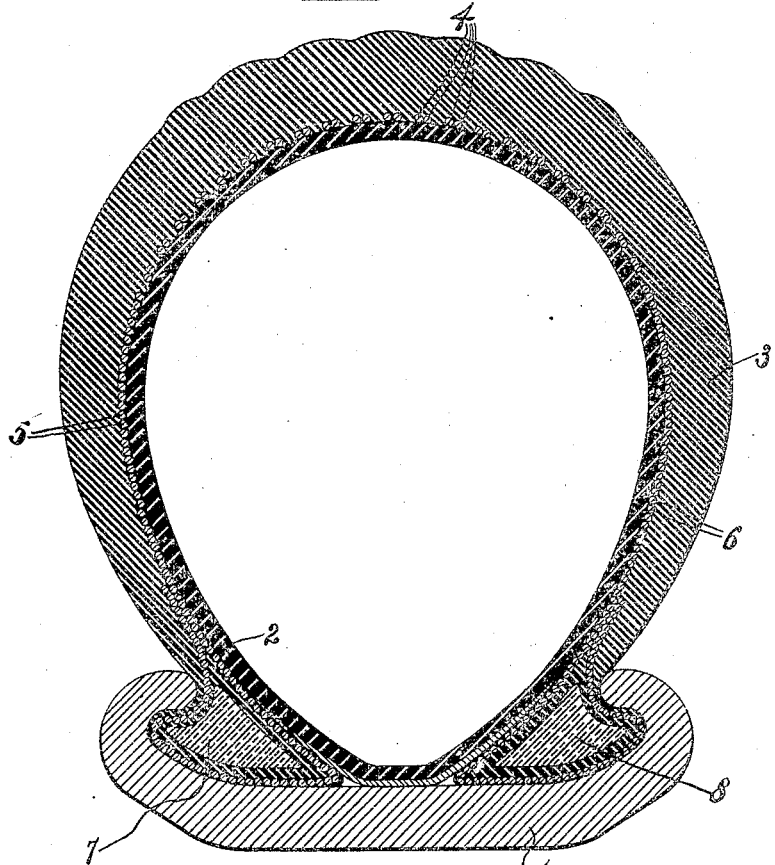
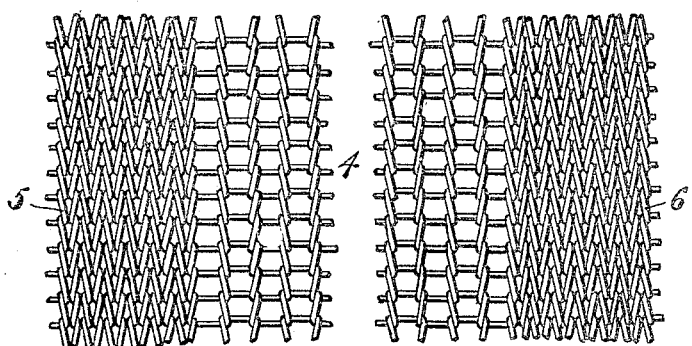

UNITED STATES PATENT OFFICE.

HENRY T. BRAGG, OF YONKERS, NEW YORK.

TIRE.

No. 835,808.

Specification of Letters Patent.

Patented Nov. 13, 1906.

Application filed January 16, 1906. Serial No. 296,260.

*To all whom it may concern:*

Be it known that I, HENRY T. BRAGG, a citizen of the United States, and a resident of Yonkers, in the county of Westchester and State of New York, have invented new and useful Improvements in Tires, of which the following is a specification.

The object of my invention is to provide certain improvements in tires whereby the resiliency of the tire will be materially increased by the use of a knitted fabric, the sides of the tire at the same time being reinforced by knitting the fabric more closely at the side of the tire than along the tread portion thereof.

A still further object is to provide a tire of the clencher type in which the above construction is provided, the clenches of the tire also having incorporated therein the more closely-knitted portions of the fabric.

It has been found in actual practice that the tendency of pneumatic tires to break along the sides thereof is extremely great while in use.

The chief object of this present invention is to provide an elastic fabric for tires which will prevent the breaking of the tire along the sides thereof, the fabric at the same time being capable of being knitted sufficiently close along the sides of the tire to properly strengthen and reinforce the same, the portion of the fabric along the tread of the tire being loosely knitted, so as to give great resiliency at this point.

A still further object is to provide a tire-shoe in which a flat-knitted fabric may be used, thus absolutely preventing any tendency of the edges of the fabric to become weakened as would be the case if a tubular-knit fabric was longitudinally severed and then incorporated in the shoe.

A practical embodiment of my invention is represented in the accompanying drawings, in which—

Figure 1 is a transverse section through a pneumatic tire of the clencher type, showing it applied to a rim; and Fig. 2 is a detail view of a portion of the knitted fabric, showing the same as being provided with a loosely-knitted tread portion and closely-knitted side portions.

The rim is denoted by 1, the inner air-tube of the tire by 2, and the tire-shoe by 3. The knitted fabric comprises a loosely-knitted tread portion 4 and closely-knitted side portions 5 and 6. This fabric is knitted flat and is incorporated in the tire-shoe, the closely-knitted portions of the fabric being of sufficient length to not only reinforce the sides of the tire-shoe, but also to pass around and reinforce the clenches 7 and 8 of the shoe.

The loosely-knitted tread portion of the fabric will permit a free yielding of the tread portion of the tire, and the reinforced side portions, which are formed integral with the knitted fabric, serve to properly strengthen the sides of the tire at the points where there is a great tendency for the tires to break when in use.

By the use of a knitted fabric constructed as herein set forth I am enabled to incorporate into the tire a fewer number of layers of fabric than has heretofore been possible in this art and at the same time obtain the greatest resiliency for the tire, because of the natural elasticity of the knitted fabric, and also obtain greater strength than has heretofore been possible with a predetermined amount of fabric.

What I claim is—

1. A tire having a knitted fabric incorporated therein, said knitted fabric having knitted reinforced portions integral therewith along the sides of the tire.

2. A tire-shoe of the clencher type having a knitted fabric incorporated therein, the said knitted fabric having knitted reinforced portions integral therewith along the sides of the shoe.

3. A tire-shoe of the clencher type having a flat-knitted fabric incorporated therein, the said flat-knitted fabric having knitted reinforced portions integral therewith along the sides of the shoe.

4. A tire having a knitted fabric incorporated therein provided with a loosely-knitted tread portion and closely-knitted side portions.

5. A tire-shoe of the clencher type having a knitted fabric incorporated therein provided with a loosely-knitted tread portion and closely-knitted side portions.

6. A tire-shoe of the clencher type having a flat-knitted fabric incorporated therein provided with a loosely-knitted tread portion and closely-knitted side portions.

7. A tire having a single layer of knitted fabric incorporated therein, a certain portion of the fabric being loosely knitted and other portions being closely knitted.

8. A tire-shoe of the clencher type having a single layer of knitted fabric incorporated therein, a certain portion of the fabric being loosely knitted and other portions being closely knitted.

9. A tire-shoe of the clencher type having a single layer of flat knitted fabric incorporated therein, a certain portion of the fabric being loosely knitted and other portions being closely knitted.

In testimony that I claim the foregoing as my invention I have signed my name, in presence of two witnesses, this 13th day of January, 1906.

HENRY T. BRAGG.

Witnesses:
 FREDK. HAYNES,
 HENRY THIEME.